(No Model.)
J. T. HART.
HAY RAKE AND LOADER.
No. 357,198. Patented Feb. 8, 1887.
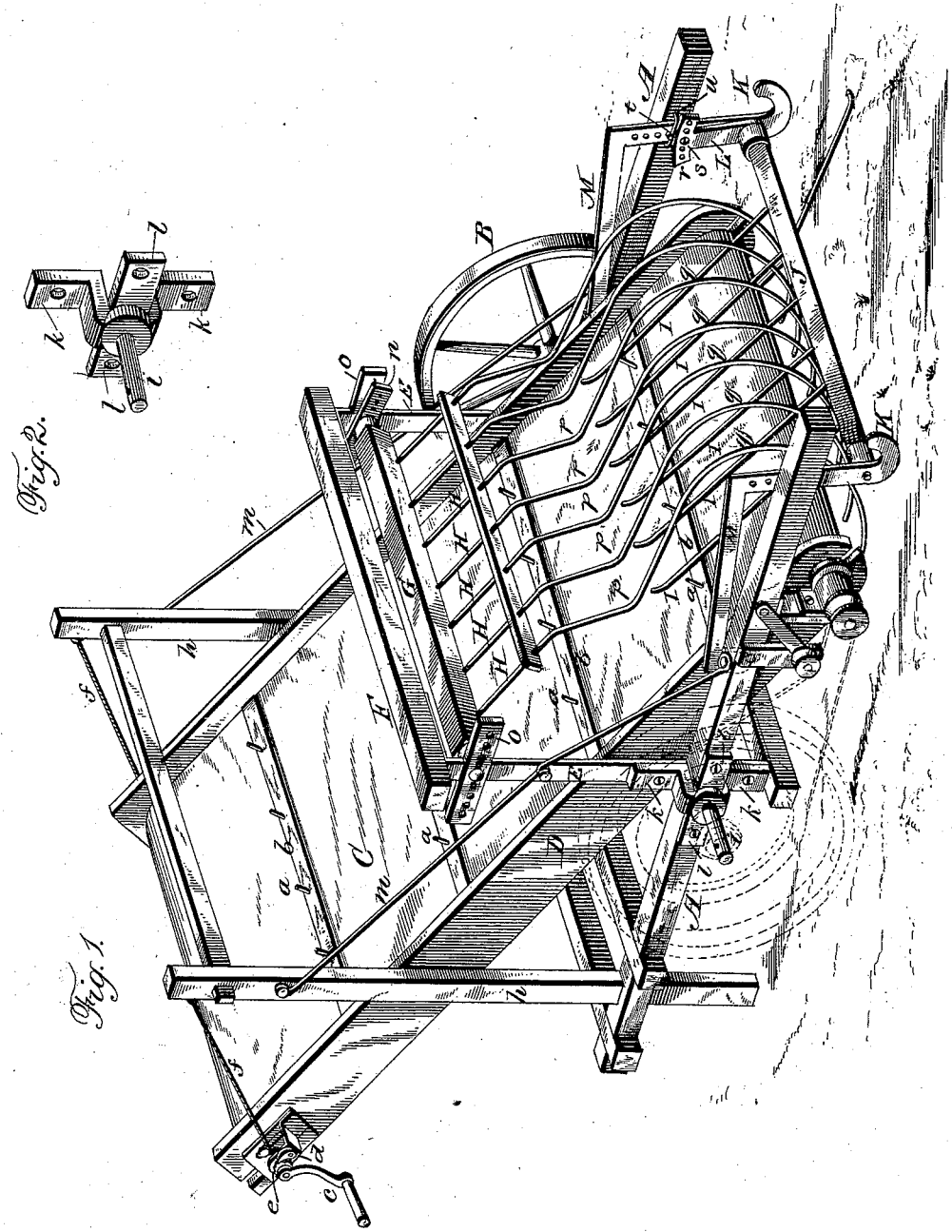
WITNESSES
Chas. Williamson
L. L. Miller
INVENTOR
Joel T. Hart,
per Chas. H. Fowler
Attorney

UNITED STATES PATENT OFFICE.

JOEL T. HART, OF FOSTER, MISSOURI.

HAY RAKE AND LOADER.

SPECIFICATION forming part of Letters Patent No. 357,198, dated February 8, 1887.

Application filed April 22, 1886. Serial No. 199,754. (No model.)

*To all whom it may concern:*

Be it known that I, JOEL T. HART, a citizen of the United States, residing at Foster, in the county of Bates and State of Missouri, have invented certain new and useful Improvements in Hay Rakes and Loaders; and I do hereby declare that the following is a full, clear, and exact description of the same, reference being being had to the annexed drawings, making a part of this specification, and to the letters and figures of reference marked thereon.

The present invention has relation to combined hay rakes and loaders, and is designed as an improvement upon my former Patent No. 279,647, dated June 19, 1883; and it consists in the details of construction substantially as shown in the drawings, and hereinafter described and claimed.

In the accompanying drawings, Figure 1 represents a perspective view of my invention, and Fig. 2 a detail perspective view of one of the wheel-shafts and its bracket.

A designates the frame of the machine supported by the wheels B, and to this frame is connected in any suitable manner the journals of rollers, around which passes the endless apron or carrier C of the usual construction, and provided with teeth $a$, secured to transverse slats $b$. The carrier-frame D, also of the usual construction, is adjustable within the frame, said carrier-frame being raised or lowered, as in my former patent, by means of the crank-handle $c$, pawl $d$, and ratchet-wheel $e$, and the cords or ropes $f$, one end connected with the ratchet-wheel shaft and the opposite end attached to the upper ends of standards $h$, secured to the frame A.

The axles $i$, upon which the wheels B are mounted, are formed with a bracket consisting of two angle or L-shaped plates, $k$, and two straight plates, $l$. The plates $k$ overlap the side beams of the frame A, and are secured by screws or bolts to vertical braces E, and the plates $l$ in like manner are fastened to the outer side of the beams, as shown, forming together a bracket that will securely fasten and hold the axles to the frame A, thereby admitting of the carrier-frame freely working in the frame of the machine. The brackets also form supports for the vertical braces E of the upright frame F, suitable stay-rods, $m$, being attached to the standards $h$, braces E, and frame A upon each side of the machine.

To the braces E are suitably pivoted the ends of a rake-head, G, having perforated rectangular plates $n$ to correspond with similar plates, $o$, secured to the braces, by which the rake can be raised or lowered, and held in such adjusted position by a pin or key engaging with the perforations in the plates.

The teeth H of the rake are of peculiar construction, being bent in V shape, as shown at $p$, and then curved, as shown at $q$, and extending around and under the lower end of the endless apron or carrier, the peculiar bend in the teeth greatly increasing their strength and durability.

In connection with the rake I provide what I term a "compressor," consisting of the fingers or rods I, which extend upwardly at an angle and between the teeth H, the fingers or rods being attached to a head, J, supported in hangers K by means of the brackets L, in which fit the ends of the compressor-head. The upper end of the brackets L are formed with a segmental perforated plate, $r$, by which it may be adjusted on the hanger and held in such position by a set screw, $s$. The hangers K are also adjustable, and to attain this end I provide the hangers with a rearwardly-extending arm, M, which is pivoted to the inner sides of the frame A, and provide the hangers with a series of perforations to receive a pin, $t$, above the guide $u$. The purpose of this compressor is to hold the hay down against the endless apron or carrier, that the teeth thereon will catch the hay and take it off the rake as fast as it is gathered.

The compressor fingers or rods I, as will be noticed, are rendered adjustable by means of the adjustability of the hangers K and brackets L, whereby the compressor-fingers are adjusted both longitudinally and vertically, whereby the pressure on the hay that is taken up by the teeth is regulated.

The endless apron or carrier C is driven by a suitable belt passing around pulleys on one of the driving-wheels and end of the lower roller of the apron or carrier, as in my former patent.

Having now fully described my invention, what I claim as new, and desire to secure by Letters Patent, is—

1. In a hay rake and loader, the combination, with the side bars of the main frame and the vertical braces of the rake-frame F, of a short axle-shaft secured at each side by means of a bracket, consisting of vertical upper and lower angular brackets, $k$, secured to the brace E, and horizontal portions $i$, secured to the side bar of the frame, substantially as set forth.

2. In a hay rake and loader, the adjustable rake-head G, provided with teeth and connected to a suitable supporting-frame, in combination with the head J, carrying compressor fingers or rods I, and connected to adjustable brackets L and adjustable hangers K, the latter being connected to the frame of the machine, substantially as and for the purpose specified.

In testimony that I claim the above I have hereunto subscribed my name in the presence of two witnesses.

JOEL T. HART.

Witnesses:
PHILIP ZEAL,
ANSON E. PERKINS.